July 19, 1960 H. J. WIRTH, JR 2,946,033

POLARIZED CONNECTOR FOR PRINTED CIRCUIT CARDS

Filed May 15, 1956 5 Sheets-Sheet 1

INVENTOR
H. J. WIRTH, JR.
BY
[signature]
ATTORNEY

July 19, 1960 H. J. WIRTH, JR 2,946,033

POLARIZED CONNECTOR FOR PRINTED CIRCUIT CARDS

Filed May 15, 1956 5 Sheets-Sheet 2

INVENTOR
H.J. WIRTH, JR
BY
[signature]
ATTORNEY

July 19, 1960 H. J. WIRTH, JR 2,946,033

POLARIZED CONNECTOR FOR PRINTED CIRCUIT CARDS

Filed May 15, 1956 5 Sheets-Sheet 3

INVENTOR
H. J. WIRTH, JR.
BY
[signature]
ATTORNEY

POLARIZED CONNECTOR FOR PRINTED CIRCUIT CARDS

Filed May 15, 1956 5 Sheets-Sheet 4

INVENTOR
H. J. WIRTH, JR.
BY
[signature]
ATTORNEY

July 19, 1960 H. J. WIRTH, JR 2,946,033

POLARIZED CONNECTOR FOR PRINTED CIRCUIT CARDS

Filed May 15, 1956 5 Sheets-Sheet 5

INVENTOR
H. J. WIRTH, JR.
BY [signature]
ATTORNEY

United States Patent Office 2,946,033

Patented July 19, 1960

2,946,033

POLARIZED CONNECTOR FOR PRINTED CIRCUIT CARDS

Henry J. Wirth, Jr., Millington, N.J., assignor to Bell Telephone Laboratories, Incorporated, New York, N.Y., a corporation of New York Filed May 15, 1956, Ser. No. 584,994

14 Claims. (Cl. 339—17)

This invention relates to connecting devices and more particularly to electrical connectors for circuit cards having electrical circuitry thereon.

In recent years printed circuitry has been used extensively in electrical equipment, and this has presented the problem of connecting this type of circuitry to the apparatus or circuits with which it is to be used. Heretofore, the connectors that have been developed for this purpose have been found to be deficient in several respects. First of all, when a group of these connectors and their corresponding circuit cards are to be mounted on a mounting panel, considerable difficulty has been encountered in distinguishing between adjacent connectors so that the proper card can be inserted therein in proper relation to the connector contacts. Also, in devices of this class wherein a plurality of external wiring terminals are used to connect the connector contacts to other apparatus or circuits, these terminals have not been readily adaptable for the use of automatic wiring techniques, such as those disclosed in the copending application of R. F. Mallina, Serial No. 401,505, filed December 31, 1953, now Patent No. 2,905,400 dated September 22, 1959. In addition, and this has been of special moment in connectors that are subject to repeated insertion and removal of the corresponding circuit card, the connector contacts have exhibited a tendency to loosen or bend, thereby impairing the electrical goodness of the connection. Furthermore, when devices of this class are to be mounted on a mounting panel, it has been found difficult to secure easily and rigidly a given connector in its corresponding panel recess.

One general object of this invention is to improve connecting devices of the type adaptable for circuit cards having electrical circuitry thereon.

More specifically, objects of this invention include to prevent positively the false insertion of a circuit card in a connector other than the particular connector designed to accommodate a given card, to provide an electrical connector that can accommodate automatic wiring techniques, to insure a uniform electrical connection therein, and to provide an electrical connector that is readily adaptable for insertion in a mounting panel.

Additional objects of this invention are to facilitate the fabrication of connectors of the type above referred to and to simplify the structure of connecting devices capable of accommodating a circuit card having electrical circuitry on one side thereof.

In one illustrative embodiment of this invention an electrical connector for circuit cards comprises a connector housing having an elongated opening therein and having a plurality of contact member recesses, contact members enclosed in said housing, polarizing elements mounted in said elongated opening, and a spring clip for holding the assembly together and for providing rigid external mounting on a mounting panel.

In accordance with one feature of this invention the connector housing is arranged so that it will accommodate a given circuit card and no other.

More specifically, in accordance with this feature of the invention, the polarizing elements are arranged in accordance with a predetermined code and are adaptable to mate with corresponding recesses in the card edge.

In accordance with another feature of this invention the contact member recesses are arranged in a plurality of parallel rows, and corresponding recesses in each row are aligned in a direction that is substantially perpendicular to the direction of these rows. Terminal portions of the contact members extend through these recesses and are readily adaptable to accommodate automatic wiring techniques.

In accordance with still another feature of this invention, the contact members are pretensioned and are rigidly held in recesses in the connector housing, thereby insuring that the electrical goodness of the connections will not be impaired by vibrations, jarring, repeated use, etc. In addition, this construction provides connections having a uniform contacting force and enables the individual contact members to be easily and quickly inserted in the connector housing during assembly.

In accordance with a further feature of the invention, the contact members have contact portions which lie substantially in the same plane, while, as previously pointed out, the terminal portions thereof are aligned in different parallel planes to accommodate automatic wiring techniques. Consequently, the connector is readily adaptable to accommodate circuit cards which have terminal tabs on one side only.

In accordance with a still further feature of this invention, the individual contact members are insulatedly separated from each other by means of separating elements which may be inserted in the connector housing and positioned in the same plane as the polarizing elements referred to above. Consequently, complete electrical independence between adjacent contact members is insured. Further, largely because of the co-planar characteristic of the polarizing elements and the separating elements, the connector can be polarized without the loss of a contact position.

In accordance with another feature of this invention, the spring clip for holding the various parts of the connector in rigid, spaced relation has projecting portions thereon which provide clip-in insertion of the connector on a mounting panel. In addition, the clips are designed so that they may be provided with elongated arms that furnish additional support for the circuit card and may be used as additional connections therefor.

The above-noted and other features of this invention will be understood more clearly and fully from the following detailed description when read in conjunction with the accompanying drawings, in which.

Figure 1:
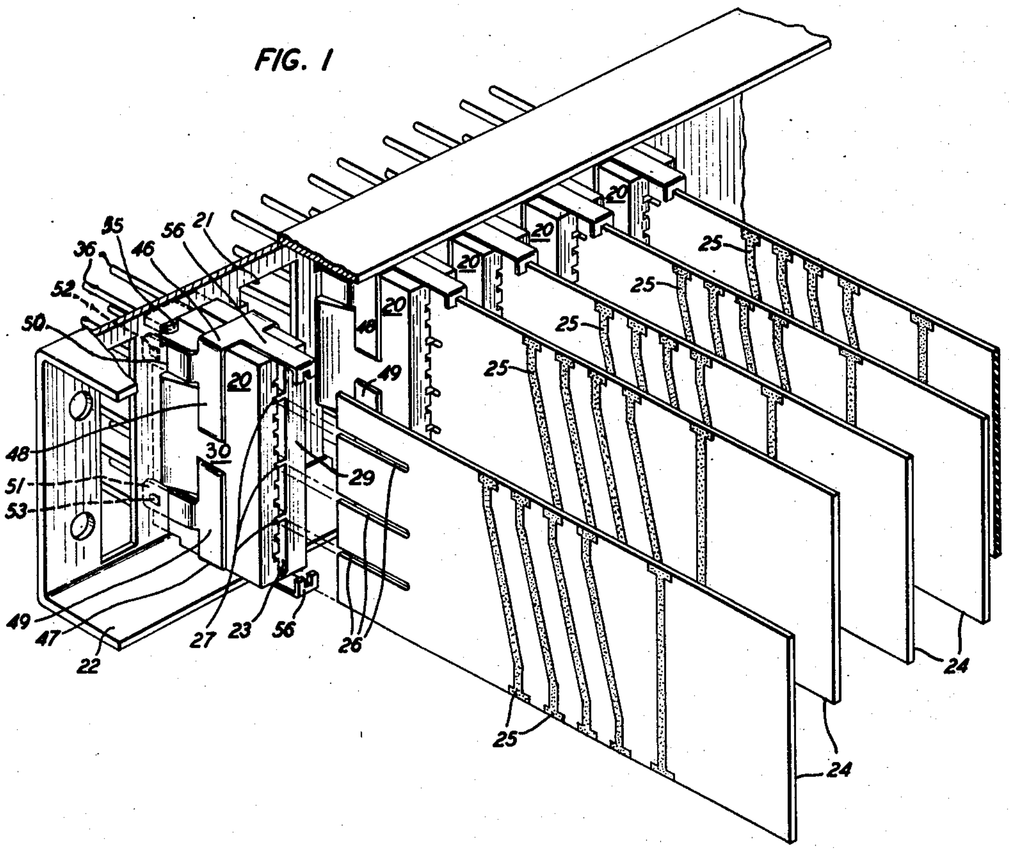
Fig. 1 is a perspective view (generally from the front) of a group of panel-mounted connectors illustrative of one embodiment of this invention.
Figure 2:
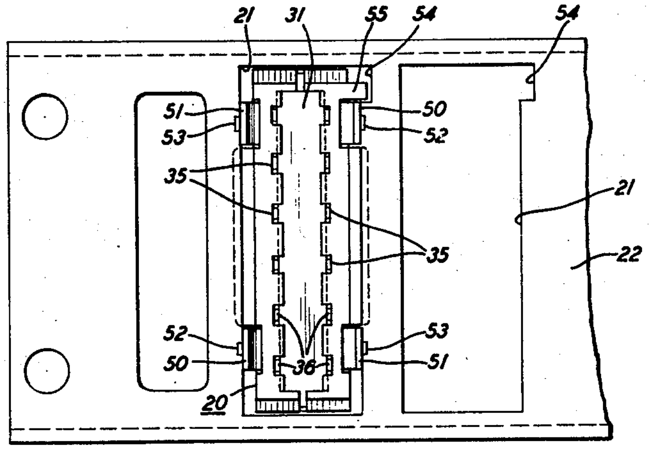
Fig. 2 is a front elevational view of one of the panel-mounted connectors illustrated in Fig. 1 as it appears from the rear or terminal side.

Referring now to Figs. 1 and 2 of the drawings, there is shown the preferred structure and assembly of the invention. A plurality of connectors, indicated generally by the reference numeral 20, are supported in rectangular openings 21 in a mounting panel 22. Each of the connectors 20 has an elongated opening 23 therein which is adapted to accommodate a nonconductive card 24 having electrical circuitry 25 thereon. The card 24 is provided with longitudinal recesses 26 which mate with corresponding polarizing elements 27 in the opening 23. The positioning of the polarizing elements 27 will subsequently be described.

Figure 3:
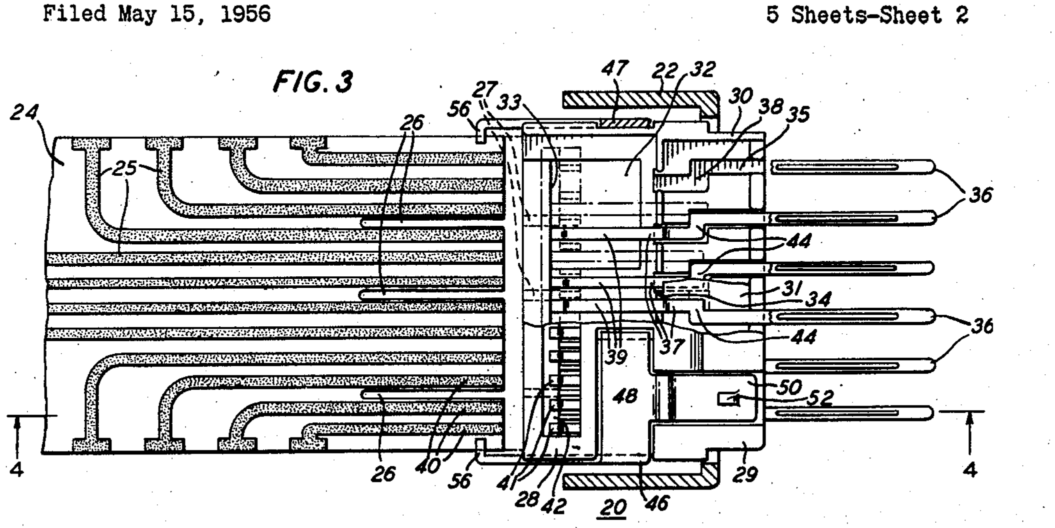
Fig. 3 is a longitudinal partially cross-sectioned view of one side of the device illustrated in Fig. 1 with a portion of the connector housing broken away.
Figures 4, 5:
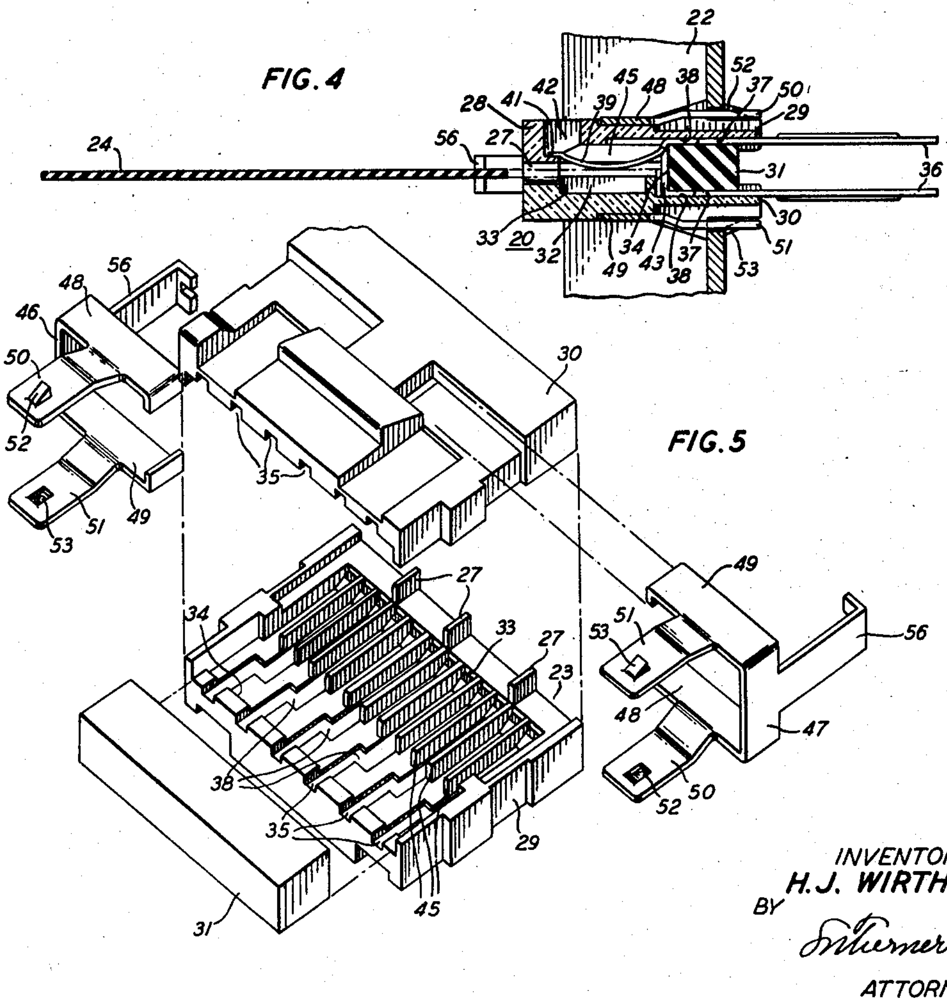
Fig. 4 is a longitudinal sectional view taken along the line 4—4 in Fig. 3.
Fig. 5 is an exploded perspective view of the connector illustrated in Fig. 1 with the contact members removed.

As shown in Figs. 3 through 5, the various parts of the connector 20 are enclosed in a connector housing 28, which may be fabricated preferably from a nonconductive plastic or other insulating material. In the embodiment as illustrated in Figs. 1 through 5, the housing 28 comprises a first portion 29, a second portion 30 and a separating bar 31, but other constructions will readily suggest themselves to those skilled in the art. The first portion 29, the second portion 30 and the separating bar 31 define an internal cavity 32 in the housing 28, which is bounded by oppositely disposed side walls 33 and 34. The side wall 33 has the elongated opening 23 therein, as hereinbefore described.

Positioned in the elongated opening 23 and integrally molded with the first portion 29 of the housing 28 are three polarizing elements 27. These elements are adapted to mate with the recesses 26 in the card 24 and are arranged in a predetermined code so that a particular connector can accommodate only that card which has been designed for insertion therein. In the disclosed embodiment 3-out-of-11 coding arrangement of the elements 27 has been used since there are eleven possible coding positions in the elongated opening 23, but it will be apparent that the code used may be varied slightly as long as the uniqueness of a particular connector and mating circuit card is retained. As shown in Fig. 3, the polarizing elements 27 and mating recesses 26 may be placed slightly off-center in order to insure that the card 24 is not inserted upside-down in the opening 23. In order to adapt the invention to large scale production techniques, it has been found convenient to mold the first portion 29 of the housing 28 from a uniform die which is designed to form eleven polarizing elements 27 and then to break off all but three of these elements in accordance with the code sequence. However, other suitable manufacturing techniques will readily suggest themselves to those skilled in the art.

A plurality of contact member recesses 35 are located in the side wall 34 and are adapted to accommodate terminal portions 36 of electrically conductive contact members 37. As shown in Fig. 2, the contact member recesses 35 are arranged in two vertical rows, and corresponding openings in each row are aligned horizontally in a direction that is substantially perpendicular to the direction of the rows. The terminal portions 36 of contact members 37 extend through the recesses 35; and, consequently, these terminal portions are modularly spaced in a plurality of parallel rows so that they are readily adaptable to accommodate automatic wiring techniques such as are described in the disclosure of R. F. Mallina hereinbefore referred to.

As shown in Figs. 3 through 5, each contact member recess 35 has an offset section 38 therein, which is adapted to accommodate the contact members 37. Each of the contact members 37 has a semielliptical contact portion 39 which extends into the internal cavity 32 and is positioned to accommodate corresponding terminal tabs 40, which constitute extensions of the circuitry 25 on the card 24. The outer segment 41 of the contact portion 39 is offset slightly and rests against the first portion 29 of the housing 28 in an elongated cavity 42. Consequently, when the various parts of the invention are assembled, the outer segment 41 of contact portion 39 will exert pressure on the first portion 29 of housing 28, thereby pretensioning the contact portion 39. When the card 24 is inserted in the elongated opening 23, the individual terminal tabs 40 will come in contact with the contact portions 39, and the pretensioning of these contact portions will insure the making of a tight uniform electrical connection that will not be adversely affected by repeated insertions and removals of the card 24 in the elongated opening 23. In addition, the pressure which the semielliptical contact portions 39 exert on the terminal tabs 40 will provide a tight-fitting mounting for the card 24.

As shown in Fig. 4, alternate ones (bottom layer in Fig. 4 and top three contact members in Fig. 3) of the contact members 37 have a first offset portion 43 thereon which extends in a direction that is substantially perpendicular to the opening 23. The offset portion 43 abuts the side wall 34 and is positioned so that the contact portions 39 of the contact members 37 will all lie substantially in the same plane. Thus, it will be apparent that the contact portions 39 are adapted to rest against respective tabs 40 even though the tabs 40 are located on one side only of the card 24.

Each of the contact members 37 (both layers in Fig. 4 and all contact members in Fig. 3) has a second offset portion 44 thereon which extends in a direction parallel to the direction of a row of the terminal portions 36 and is adapted to rest in the offset section 38 of contact member recesses 35. In addition to facilitating the uniplanar arrangement of the contact portions 39, the offset portions 44 and mating offset sections 38 insure that the contact members 37 will be rigidly held in position and will establish a uniform and tight electrical connection with the terminal tabs 40 on the card 24.

The contact members 37 are maintained in electrically independent relation inside the housing 28 by separating elements 45 (Fig. 5), which are molded integrally with the lower portion 29 of housing 28. Each of the elements 45 extends into the internal cavity 32 and is aligned between adjacent contact members 37 in a plane that is substantially perpendicular to the elongated opening 23. In addition, each of the polarizing elements 27 is positioned in the same plane as its adjacent separating element 45. This construction insures that the contact members 37 will be located between the polarizing elements 27; and, consequently, any number of polarizing elements 27 may be used without the loss of a contact position. Thus, each connector made in accordance with this feature of the invention can provide a number of completely independent electrical connections, and the number of these connections is in no way affected by the particular arrangement or number of the polarizing elements 27.

The entire assembly is held together by two C-shaped spring clips 46 and 47. Each of these clips has legs 48 and 49 thereon which are adapted to fit over the first portion 29 and the second portion 30, respectively, of the housing 28. In addition, legs 48 and 49 have extensions 50 and 51 thereon upon which are mounted projecting portions 52 and 53. When the connector 20 is inserted in one of the rectangular recesses 21 in the mounting panel 22 (Fig. 2), projecting portions 52 and 53 snap in place to rigidly support the connector 20 in the panel 22. Furthermore, the connector 20 can readily be removed from its mounting by pressing extensions 50 and 51 toward each other. In order to insure that the connector 20 is not inverted with respect to the mounting panel 22, the opening 21 may be provided with a notch 54 which is adapted to mate with a projection 55 on the first portion 29 of the housing 28. It will be apparent that unless the notch 54 is properly aligned with the projection 55, the connector 20 cannot be inserted in the mounting panel 22.

In addition to the extensions 50 and 51, each of the clips 46 and 47 may be provided with an elongated arm 56. The arm 56 extends from clips 46 and 47 in a direction opposite to that of extensions 50 and 51, and the outer end of this arm is adapted to accommodate the circuit card 24 as shown in Figs. 1 and 3. In certain instances the arm 56 may be safely eliminated; however, whenever operating conditions require support for the card 24 in addition to the support provided by the connector housing 28, the use of arm 56 will provide a rigid card mounting. In addition, and this becomes of added importance when an increased number of connections are desired for a connector of given size, additional circuit tabs on the card (not shown) may be connected with arm 56, and the clips 46 and 47 may be made of electrically conductive material to furnish additional connections, such as connection to ground, without increasing the over-all size of the device.

With reference to Figs. 6 through 14 of the drawings it will be observed that some of the structural features of the embodiments of the invention disclosed therein are for the most part substantial equivalents of those disclosed in the embodiment of the invention illustrated in Figs. 1 through 5. The structural configuration of certain of these features has been altered slightly to indicate different designs that are common to many of the disclosed embodiments, but it should by no means be inferred that these altered designs are restricted to one of the disclosed embodiments alone. In some instances similar parts of the various groups of figures have been given the same numerical designation in order to indicate their substantial similarity.

Figure 6:
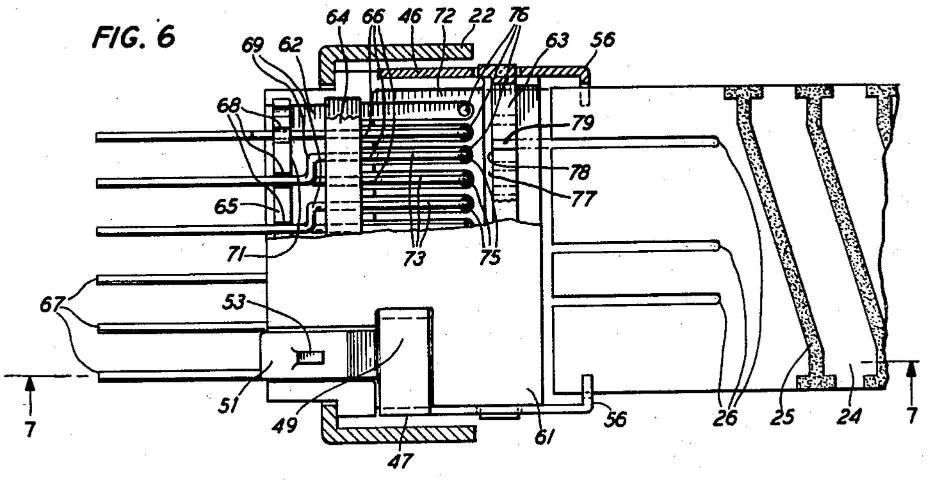
Fig. 6 is a longitudinal partially cross-sectioned view of a panel-mounted connector illustrative of another disclosed embodiment of this invention with a portion of the connector housing broken away.
Figure 7:
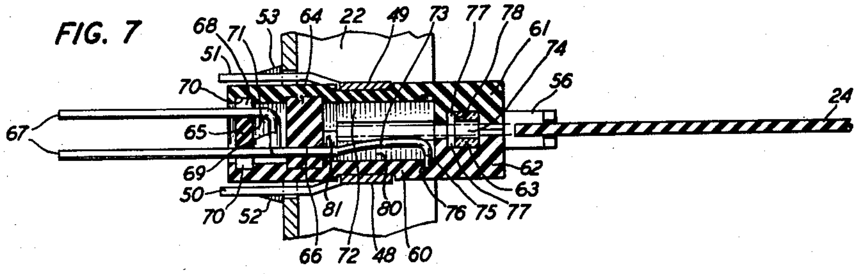
Fig. 7 is a longitudinal sectional view taken along the line 7—7 in Fig. 6.
Figure 8:
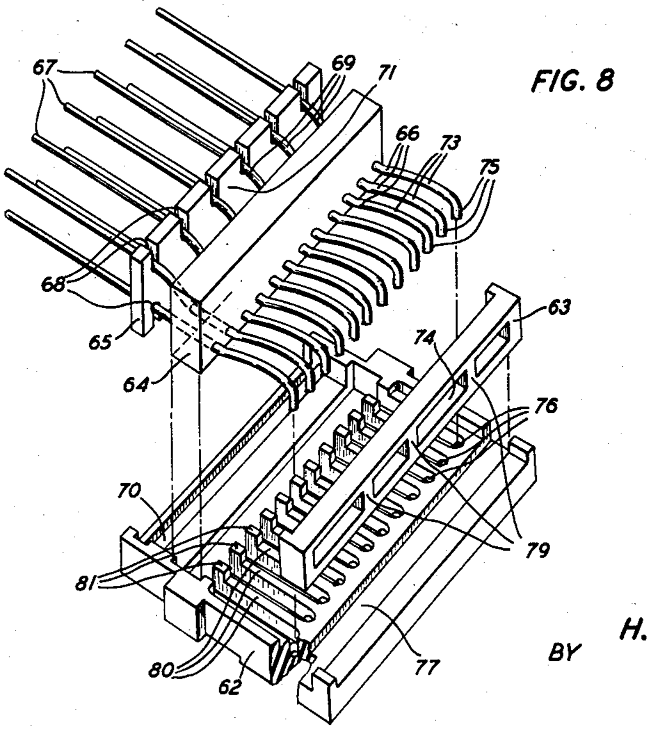
Fig. 8 is an exploded perspective view of the device illustrated in Fig. 6 with the spring clips and a portion of the connector housing removed.

Referrng now to Figures 6 through 8 of the drawings, there is shown a connector illustrative of a second disclosed embodiment of the invention. The various parts of the connector are enclosed in a connector housing 60, which comprises a first portion 61, a second portion 62, a coding bar 63, a separating bar 64 and a terminal spacer 65, all of which are held in cooperative relation by the clips 46 and 47 in a manner similar to that shown in Fig. 1. A plurality of contact members 66 are rigidly molded or otherwise affixed to the separating bar 64, and each of the contact members 66 has a terminal portion 67 that extends through a recess 68 in the terminal spacer 65. As shown in Fig. 8, the recesses 68 are arranged in two horizontal rows, and corresponding recesses in each row are aligned vertically in a direction that is substantially perpendicular to the direction of the rows. Alternate ones of the contact members 66 are provided with an offset portion 69 that enables the terminal portions 67 to extend through the recesses 68 in the terminal spacer 65. Consequently, the terminal portions 67 are modularly spaced in a plurality of parallel rows and are readily adaptable to accommodate automatic wiring techniques of the type hereinbefore referred to. The terminal spacer 65 is mounted in spacer grooves 70 in the first portion 61 and the second portion 62 of the housing 60, and the inner surface of this terminal spacer 65 forms a side wall 71 which partially defines an internal cavity 72 in the housing 60.

The contact members 66 are provided with semi-elliptical contact portion 73 that is designed to mate with the tabs 40 (Fig. 3) when the circuit card 24 is inserted in an elongated opening 74 in the coding bar 63. The outer end 75 of each contact portion 73 is inserted in a corresponding depression 76 in the second portion 62 of the connector housing 60 and is designed so that when the various parts of the device are assembled each of the contact portions 73 will be pretensioned and will thereby insure a uniform and tight electrical connection when the card 24 is inserted in the elongated opening 74.

The coding bar 63 is mounted in coding grooves 77 in the first portion 61 and the second portion 62 of the housing 60, and this coding bar 63 forms a side wall 78 that is oppositely disposed to the side wall 71 and further defines the internal cavity 72 in the housing 60. The coding bar 63 is provided with three polarizing elements 79 that fulfill a function similar to the polarizing elements 27 shown in the first disclosed embodiment of the invention. The polarizing elements 79 are arranged in a different location in each individual coding bar in accordance with the 3-out-of-11 code and are positioned to mate with the recesses 26 in the card 24 so that only one card is capable of insertion in its corresponding connector. By mounting the polarizing elements 79 on the coding bar 63, the particular code combination of a given connector can be easily altered by removing the coding bar 63 from the assembly and substituting another code bar with a different code combination thereon. Furthermore, the use of a coding bar that is separate from the remainder of the connector housing will greatly facilitate manufacturing techniques since the design of the first portion 61 and the second portion 62 of housing 60 is independent of the particular code combination assigned to a given connector.

Separating elements 80 are provided in the second portion 62 of the housing 60, and these elements extend into the internal cavity 72 to insure that each of the contact members 66 is maintained in electrically insulated relation to the remainder of the assembly. In addition, some or all of the separating elements 80 may be provided with a card stop portion 81 so that the card 24 will extend into the cavity 72 a predetermined amount.

Figure 9:
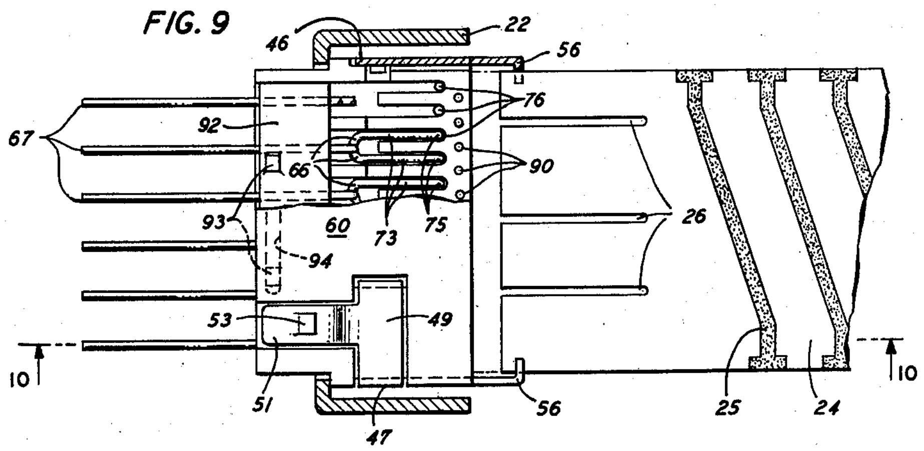
Fig. 9 is a longitudinal partially cross-sectioned view of a panel-mounted connector illustrative of a third disclosed embodiment of this invention with a portion of the connector housing broken away.
Figure 10:
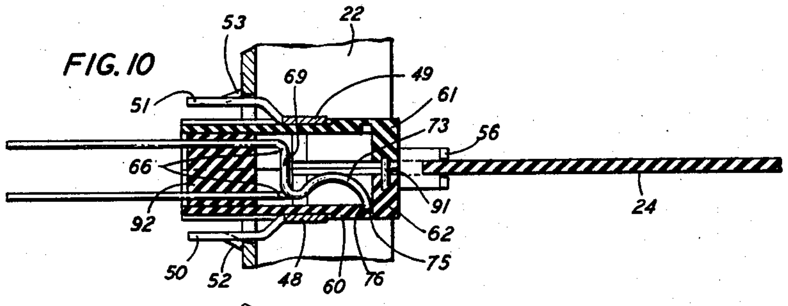
Fig. 10 is a longitudinal sectional view taken along the line 10—10 in Fig. 9.
Figure 11:
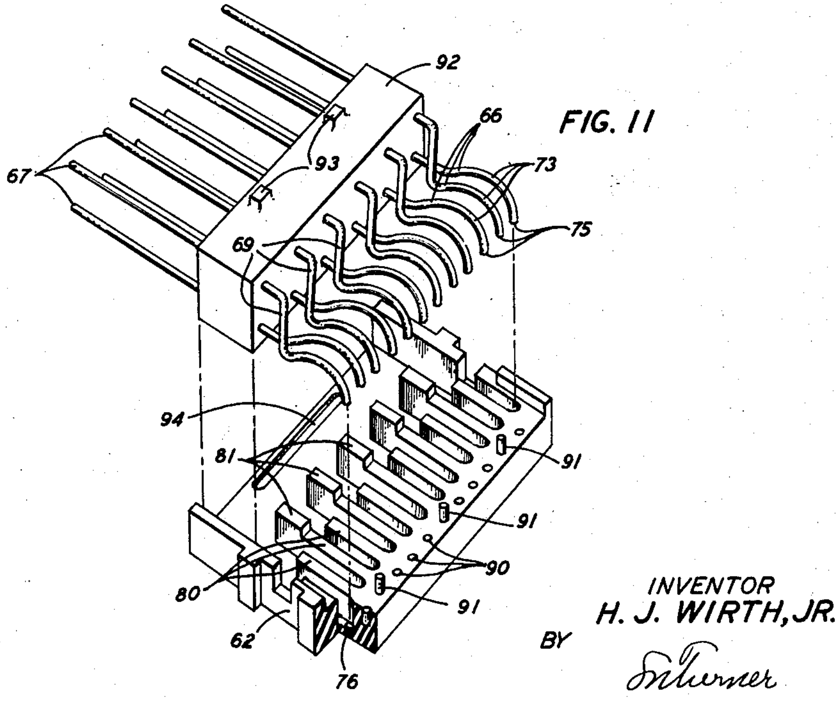
Fig. 11 is an exploded perspective view of the device illustrated in Fig. 9 with the spring clips and a portion of the connector housing removed.

Referring now to Figs. 9 through 11 of the drawings, there is shown a third disclosed embodiment of the invention. This embodiment is similar in most respects to the embodiment disclosed in Figs. 6 through 8, with the exception of the means used to polarize the individual connectors and of the manner in which the contact members 66 are supported.

The second portion 62 of the housing 60 is provided with a plurality of pin holes 90 which are adapted to accommodate polarizing pins 91. The number of holes 90 that are used will depend on the number of code positions in the desired code, and since a 3-out-of-11 code has been employed throughout the various disclosed embodiments it will be noted that eleven pin holes 90 have been illustrated in Fig. 11. Three polarizing pins 91 are inserted in three of the pin holes 90 in accordance with the desired code combination, and the pins 91 can easily be removed or interchanged to provide a different code combination for a particular connector. When the device is assembled, clips, such as clip 47, hold the first portion 61 and the second portion 62 of the housing 60 in proper relation to each other; and, consequently, the pins 90, which are positioned therebetween, are rigidly held in place.

The contact members 66 are imbedded in a separating bar 92 which is similar to the separating bar 64 (Fig. 8) disclosed in the second embodiment of the invention except that the bar 92 has positioning elements 93 on the upper and lower surfaces thereof. These elements are adapted to mate with slots 94 in the first portion 61 and the second portion 62 of housing 60 and assist in easily and quickly locating the separating bar 92 in its proper position during assembly.

Figure 12:
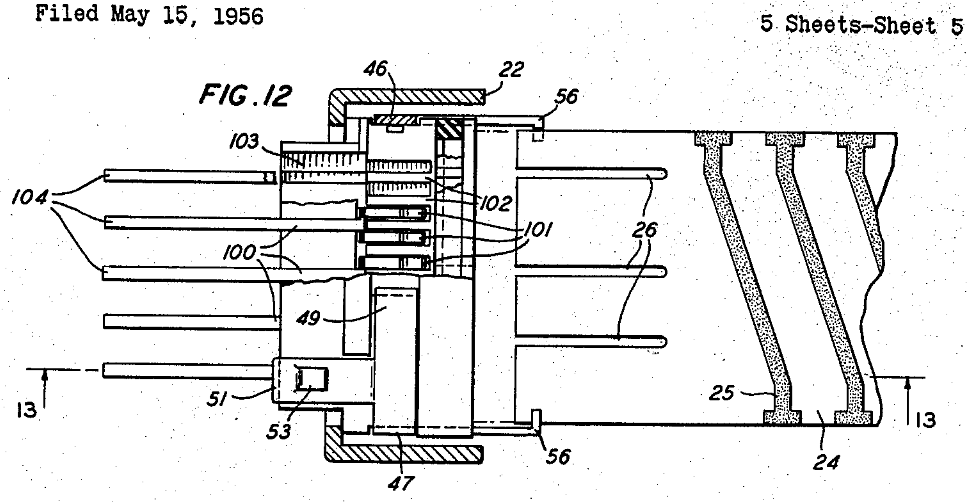
Fig. 12 is a longitudinal partially cross-sectioned view of a panel-mounted connector illustrative of a fourth disclosed embodiment of this invention with a portion of the connector housing broken away.
Figure 13:
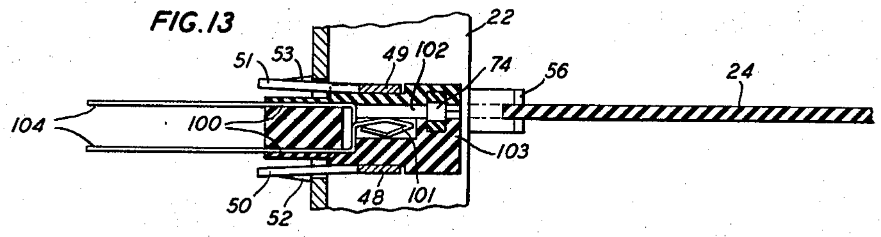
Fig. 13 is a longitudinal sectional view taken along the line 13—13 in Fig. 12.
Figure 14:
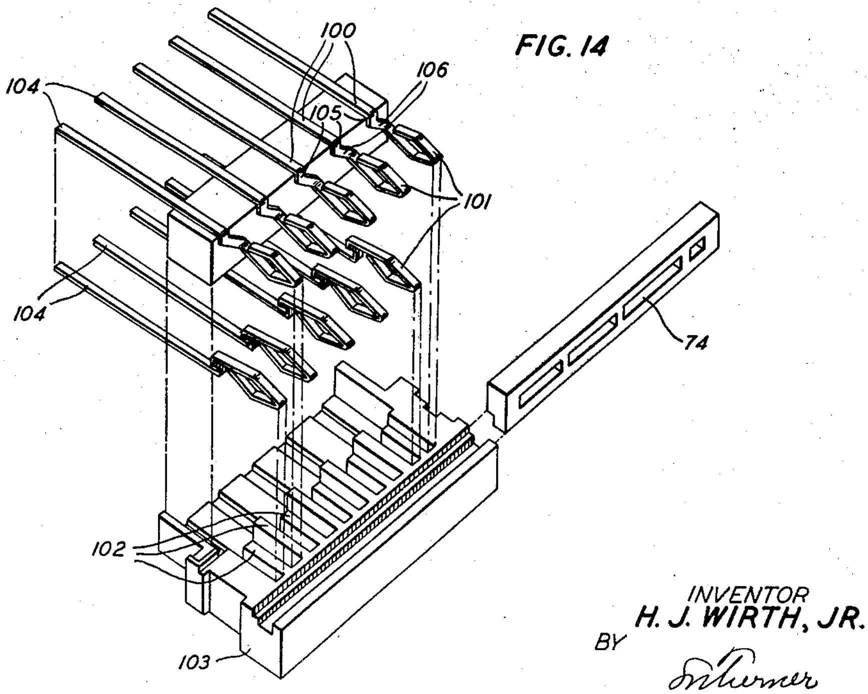
Fig. 14 is an exploded perspective view of the device illustrated in Fig. 12 with the spring clips and a portion of the connector housing removed.

Referring now to Figs. 12 through 14, there is shown a fourth disclosed embodiment of the invention wherein flat contact members 100 are used to provide the necessary connections with the tabs 40 (Fig. 3) on the circuit card 24. As shown in Figs. 13 and 14, each of the contact members 100 has a semielliptical contact portion 101 which is doubled back upon itself and is inserted between adjacent separating elements 102 in the lower portion 103 of the connector housing. When the card 24 is inserted in the elongated opening 74 the terminal tabs 40 thereon engage the contact portions 101 and tend to compress these portions so that a slight pressure is exerted on the tabs 40. Consequently, a tight electrically conductive path is formed from the tabs 40 to terminal portions 104 of the contact members 100 and this path is not adversely affected by repeated insertion and removal of the card 24 in the opening 74.

Each of the contact members 100 is provided with a first offset portion 105 and a second offset portion 106. The first offset portion 105 extends in a direction perpendicular to the direction of the elongated opening 74 and is designed so that all of the contact portions 101 of contact members 100 will lie substantially in the same plane while the terminal portions 104 will lie in two parallel planes. The second offset portion 106 extends in a direction parallel to the direction of the elongated opening 74 to enable corresponding terminal portions 104 in each of the parallel planes to be vertically aligned. Consequently, the terminal portions 104 are readily adaptable for automatic wiring techniques of the type hereinbefore referred to. In addition, all of the contact members 100 are of uniform construction thereby facilitating the manufacture thereof.

It is apparent that the various modifications of the component parts of the invention are, in many instances, interchangeable with each other and that certain of the mechanical and electrical details shown in the various disclosed embodiments may be modified without departing from the scope and spirit of the invention.

What is claimed is:

1. An electrical connector for circuit cards having a plurality of terminal tabs thereon and having coding recesses thereon located between said tabs, said connector comprising a connector housing having an elongated opening therein adapted to receive said card and having a plurality of contact member recesses, a plurality of contact members enclosed in said housing and insulatedly separated from each other, each of said contact members having a terminal portion extending through one of said contact member recesses and having a contact portion adjacent said elongated opening and adapted to engage one of said tabs, and a plurality of polarizing elements integral with said housing and mounted in said elongated opening between contact members to polarize the connector without the loss of a contact position and adapted to engage corresponding coding recesses on said card in accordance with a predetermined code.

2. An electrical connector for circuit cards having a plurality of terminal tabs thereon and having coding recesses thereon located between said tabs, said connector comprising a connector housing having an elongated opening therein adapted to receive said card and having a plurality of modularly spaced contact member recesses arranged in parallel rows, a plurality of contact members enclosed in said housing and insulatedly separated from each other, each of said contact members having a terminal portion extending through one of said contact member recesses and having a contact portion adjacent said elongated opening and adapted to engage one of said tabs, said contact portions of all of said members lying substantially in the same plane, and a plurality of polarizing elements projecting from the inside wall of said elongated opening and between contact members to polarize the connector without the loss of a contact position, said polarizing elements being adapted to engage corresponding code recesses on said card in accordance with a predetermined code.

3. An electrical connector for circuit cards having a plurality of terminal tabs thereon and having coding recesses thereon located between said tabs, said connector comprising a connector housing having an elongated opening therein adapted to receive said card and having a plurality of contact member recesses, said contact member recesses being arranged in a plurality of parallel rows, corresponding contact member recesses in each of said rows being aligned in a direction perpendicular to the direction of said rows, a plurality of contact members enclosed in said housing, each of said contact members having a terminal portion extending through one of said contact member recesses and having a contact portion adjacent said elongated opening and adapted to engage one of said tabs, said contact portions of all of said members lying substantially in the same plane, and a plurality of polarizing elements projecting from the inside wall of said elongated opening and between contact members to polarize the connector without the loss of a contact position, said polarizing elements being adapted to engage corresponding recesses on said card.

4. The electrical connector defined in claim 3 in which said housing comprises first and second sections having respectively first and second abutting surfaces, and clip means comprising a C-shaped member having each leg thereof adjacent one of said sections, projecting portions on each of said legs for rigid external mounting of the connector and extension means on each of the legs for supporting a printed circuit card.

5. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, a plurality of elongated contact members enclosed in said housing, each of said contact members having a terminal portion extending through one of said contact member recesses and having a contact portion adjacent said elongated opening and adapted to engage one of said tabs, a plurality of separating elements mounted in said housing cavity, each of said separating elements being positioned between adjacent contact members and extending in a plane perpendicular to said elongated opening, and a plurality of polarizing elements integral with said housing and mounted in said elongated opening in coplanar relationship with the separating element planes, and said elements being adapted to engage corresponding recesses on said card in accordance with a predetermined code.

6. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, said contact member recesses being arranged in a plurality of parallel rows, corresponding contact member recesses in each of said rows being aligned in a direction perpendicular to the direction of said rows, a plurality of elongated contact members enclosed in said housing, each of said contact members having a terminal portion extending through one of said contact member openings and having a contact portion adjacent said elongated opening and adapted to engage one of said tabs, means for causing said contact portions of all of said members to lie substantially in the same plane, a plurality of separating elements mounted in said housing cavity, each of said separating elements being positioned between adjacent contact members and extending in a plane perpendicular to said elongated opening, and a plurality of polarizing elements integral with said housing and mounted in said elongated opening in coplanar relationship with the separating element planes, and said elements being adapted to engage corresponding recesses on said card in accordance with a predetermined code.

7. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, said contact member recesses being arranged in a plurality of parallel rows, corresponding contact member recesses in each of said rows being aligned in a direction perpendicular to the direction of said rows, a plurality of elongated pretensioned contact members enclosed in said housing, each of said contact members having a terminal portion extending through one of said contact member recesses and having a semielliptical contact portion adjacent said elongated opening and adapted to engage one of said tabs, said contact portions of all of said members lying substantially in the same plane, said means including the provision on alternate ones of said contact members of a first offset portion extending in a direction perpendicular to said elongated opening and abutting the internal surface of said other of said side walls and the provision on each of said contact members of a second offset portion extending in a direction parallel to the direction of said rows, said second offset portion rigidly fixing the contact member against movement in a plane perpendicular to said elongated opening, a plurality of separating elements mounted in said housing cavity, each of said separating elements being positioned between adjacent contact members and extending into said cavity in a plane perpendicular to said elongated opening, and a plurality of polarizing elements integral with said one of said side walls and extending into said elongated opening in coplanar relationship with the separating element planes, said polarizing elements being adapted to engage corresponding recesses on said card in accordance with a predetermined code.

8. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, said one of said side walls including a replaceable coding bar bordering said elongated opening, said contact member recesses being arranged in a plurality of parallel rows, corresponding contact member recesses in each of said rows being aligned in a direction perpendicular to the direction of said rows, a plurality of elongated contact members enclosed in said housing, each of said contact members having a terminal portion extending through one of said contact member recesses and having a contact portion adjacent said elongated opening and adapted to engage one of said tabs, said contact portions of all of said members being offset to lie substantially in the same plane, and a plurality of polarizing elements integral with said coding bar in said elongated opening to polarize said connector without the loss of a contact position and adapted to engage corresponding recesses on said card in accordance with a predetermined code.

9. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, said one of said side walls including a replaceable coding bar bordering said elongated opening and said other of said side walls including a terminal spacer between said contact member recesses, said contact member recesses being arranged in a plurality of parallel rows, corresponding contact member recesses in each of said rows being aligned in a direction perpendicular to the direction of said rows, a plurality of elongated pretensioned contact members enclosed in said housing, each of said contact members having a terminal portion extending through one of said contact member recesses and having a semielliptical contact portion adjacent said elongated opening, and adapted to engage one of said tabs, said contact portions of all of said members lying substantially in the same plane, a separating bar located in said cavity between said side walls for holding said contact members in insulated relation to each other, a plurality of separating elements mounted in said housing cavity, each of said separating elements being positioned between adjacent contact members and extending into said cavity in a plane perpendicular to said elongated opening, and a plurality of polarizing elements integral with said coding bar on said one of said side walls and extending into said elongated opening in coplanar relationship with the separating element planes, said polarizing elements being adapted to engage corresponding recesses on said card in accordance with a predetermined code.

10. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, said one of said side walls including a replaceable coding bar defining said elongated opening, said contact member recesses being arranged in a plurality of parallel rows, corresponding contact member recesses in each of said rows being aligned in a direction perpendicular to the direction of said rows, a plurality of elongated pretensioned contact members enclosed in said housing, each of said contact members having a terminal portion extending through one of said contact member recesses and having a doubled back semielliptical contact portion adjacent said elongated opening and adapted to engage one of said tabs, said contact portions of all of said members being offset to lie substantially in the same plane, a plurality of separating elements mounted in said housing cavity, each of said separating elements being positioned between adjacent contact members and extending into said cavity in a plane perpendicular to said elongated opening, and a plurality of polarizing elements integral with said coding bar on said one of said side walls and extending into said elongated opening in coplanar relationship with the separating element planes, said polarizing elements being adapted to engage corresponding recesses on said card in accordance with a predetermined code.

11. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and including a plurality of pin holes aligned in a direction parallel to said elongated opening, the other of said side walls defining a plurality of modularly spaced contact member recesses, said contact member recesses being arranged in a plurality of parallel rows, corresponding contact member recesses in each of said rows being aligned in a direction perpendicular to the direction of said rows, a plurality of elongated contact members enclosed in said housing, each of said contact members having a terminal portion extending through one of said contact member recesses and having a contact portion adjacent said elongated opening and adapted to engage one of said tabs, said contact portions of all of said members being offset to lie substantially in the same plane, and a plurality of polarizing pins insertable into said plurality of pin holes in said one of said side walls to polarize the connector without the loss of a contact position and adapted to engage corresponding recesses on said card in accordance with a predetermined code.

12. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and including a plurality of pin holes aligned in a direction parallel to said elongated opening, the other of said side walls defining a plurality of modularly spaced contact member recesses, said contact member recesses being arranged in a plurality of parallel rows, corresponding contact member recesses in each of said rows being aligned in a direction perpendicular to the direction of said rows, a plurality of elongated pretensioned contact members enclosed in said housing, each of said contact members having a terminal portion extending through one of said contact member recesses and having a semielliptical contact portion adjacent said elongated opening and adapted to engage one of said tabs, means for causing said contact portions of all of said members to lie substantially in the same plane, a plurality of separating elements mounted in said housing cavity, each of said separating elements being positioned between adjacent contact members and extending into said cavity in a plane perpendicular to said elongated opening, and a plurality of replaceable polarizing pins insertable into said plurality of pin holes on said one of said side walls and extending into said elongated opening in coplanar relationship with the separating element planes, said polarizing pins being adapted to engage corresponding recesses on said card in accordance with a predetermined code.

13. An electrical connector for circuit cards having a plurality of terminal tabs on one side thereof and having coding recesses thereon located between said tabs, said connector comprising a nonconductive housing having oppositely disposed side walls partially defining an internal cavity, one of said side walls defining an elongated opening adapted to receive said card and the other of said side walls defining a plurality of modularly spaced contact member recesses, said contact member recesses being arranged in a plurality of parallel rows, corresponding contact member recesses in each of said rows being aligned in a direction perpendicular to the direction of said rows, each of said contact members having a terminal portion extending through one of said contact member recesses and contact portion adjacent said elongated opening, said contact portion including semielliptical and offset sections, said offset sections lying in a plane parallel to said elongated opening and acting against said housing to pretension said elliptical section, said contact portion engaging said tabs and supporting the card, said contact portions of all of said members being offset to lie substantially in the same plane, a plurality of separating elements mounted in said housing cavity, each of said separating elements being positioned between adjacent contact members and extending into said cavity in a plane perpendicular to said elongated opening, and a plurality of polarizing elements integral with said housing and mounted on said one of said side walls and extending into said elongated opening in coplanar relationship with the separating element planes, said polarizing elements being adapted to engage corresponding recesses on said card in accordance with a predetermined code.

14. An electrical connector for circuit cards having a plurality of terminal tabs thereon and having a coding recess thereon located between said tabs, said connector comprising a connector housing having an elongated opening therein adapted to receive said card and having a plurality of contact member recesses, a plurality of contact members enclosed in said housing and insulatedly separated from each other, each of said contacts having a terminal portion extending through one of said contact member recesses and having a contact portion adjacent said elongated opening and adapted to engage one of said tabs, and a polarizing element integral with said housing and mounted in said opening between contact members, said element being adapted to engage said coding recess.

References Cited in the file of this patent

UNITED STATES PATENTS

| | | |
|---|---|---|
| 1,718,529 | Coldwell | June 25, 1929 |
| 2,281,958 | Snavely | May 5, 1942 |
| 2,330,838 | Nelson | Oct. 5, 1943 |
| 2,505,979 | Martin | May 2, 1950 |
| 2,699,534 | Klostermann | Jan. 11, 1955 |
| 2,765,450 | Richardson | Oct. 2, 1956 |
| 2,799,837 | Powell | July 16, 1957 |